United States Patent
Pierenkemper et al.

[11] Patent Number: 6,119,942
[45] Date of Patent: Sep. 19, 2000

[54] METHOD AND APPARATUS FOR DETERMINING THE POSITION OF THE FOCUS OF AN OPTO-ELECTRONIC APPARATUS

[75] Inventors: Hans-Werner Pierenkemper; Jürgen Reichenbach, both of Emmendingen, Germany

[73] Assignee: Sick AG, Waldkirch/Breisgau, Germany

[21] Appl. No.: 09/102,546

[22] Filed: Jun. 22, 1998

[30] Foreign Application Priority Data

Jun. 23, 1997 [DE] Germany .......................... 197 26 581

[51] Int. Cl.[7] .............................. G02B 26/08; G06K 7/10
[52] U.S. Cl. ................... 235/462.22; 235/462.23
[58] Field of Search ................. 235/454, 462.22, 235/462.23, 462.21, 462.33, 462.42, 472.01, 462.38, 462.39, 462.25; 250/235, 236; 359/197; 382/255

[56] References Cited

U.S. PATENT DOCUMENTS

| | | | |
|---|---|---|---|
| 4,818,886 | 4/1989 | Drucker | 250/566 |
| 4,920,255 | 4/1990 | Gabeler | 235/454 |
| 4,990,771 | 2/1991 | Minoura et al. | 250/236 |
| 5,347,121 | 9/1994 | Rudeen | 235/462.22 X |
| 5,386,107 | 1/1995 | Dvorkis et al. | 235/462.23 |
| 5,418,638 | 5/1995 | Hirasawa | 359/197 |
| 5,565,668 | 10/1996 | Reddersen et al. | 235/462.22 |
| 5,717,194 | 2/1998 | Forbes et al. | 235/454 X |

FOREIGN PATENT DOCUMENTS

| | | |
|---|---|---|
| 2659618C2 | 8/1986 | Germany . |
| 3819005A1 | 1/1989 | Germany . |
| 4025577A1 | 2/1992 | Germany . |
| 4031995A1 | 4/1992 | Germany . |
| 4137832A1 | 5/1993 | Germany . |
| 4222970A1 | 1/1994 | Germany . |
| 4219311C2 | 3/1996 | Germany . |
| 19523886A1 | 1/1997 | Germany . |
| 04001509 | 1/1992 | Japan . |

*Primary Examiner*—Karl D. Frech
*Assistant Examiner*—Jared J. Fureman
*Attorney, Agent, or Firm*—Townsend and Townsend and Crew LLP

[57] ABSTRACT

A method is described for the determination of the position of the focus of an opto-electronic apparatus, in particular of a bar code reader, which transmits a light beam through a focusing lens. In the method the width of the transmitted light beam is determined at a specific reference position and the position of the focus is determined from the width that is found. Furthermore the invention is directed to an opto-electronic apparatus, in particular to a bar code reader for carrying out the method.

29 Claims, 3 Drawing Sheets

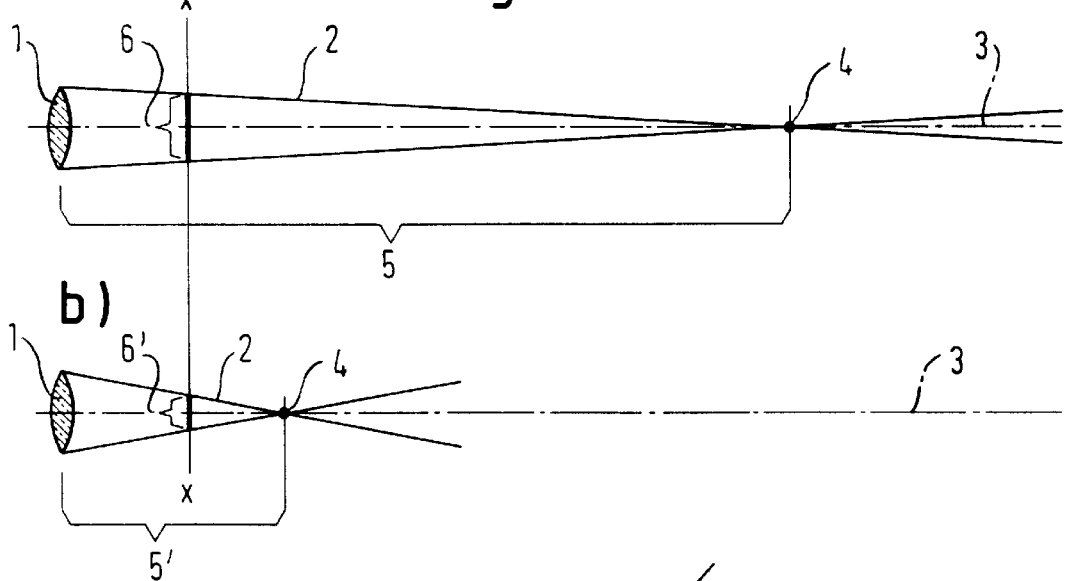
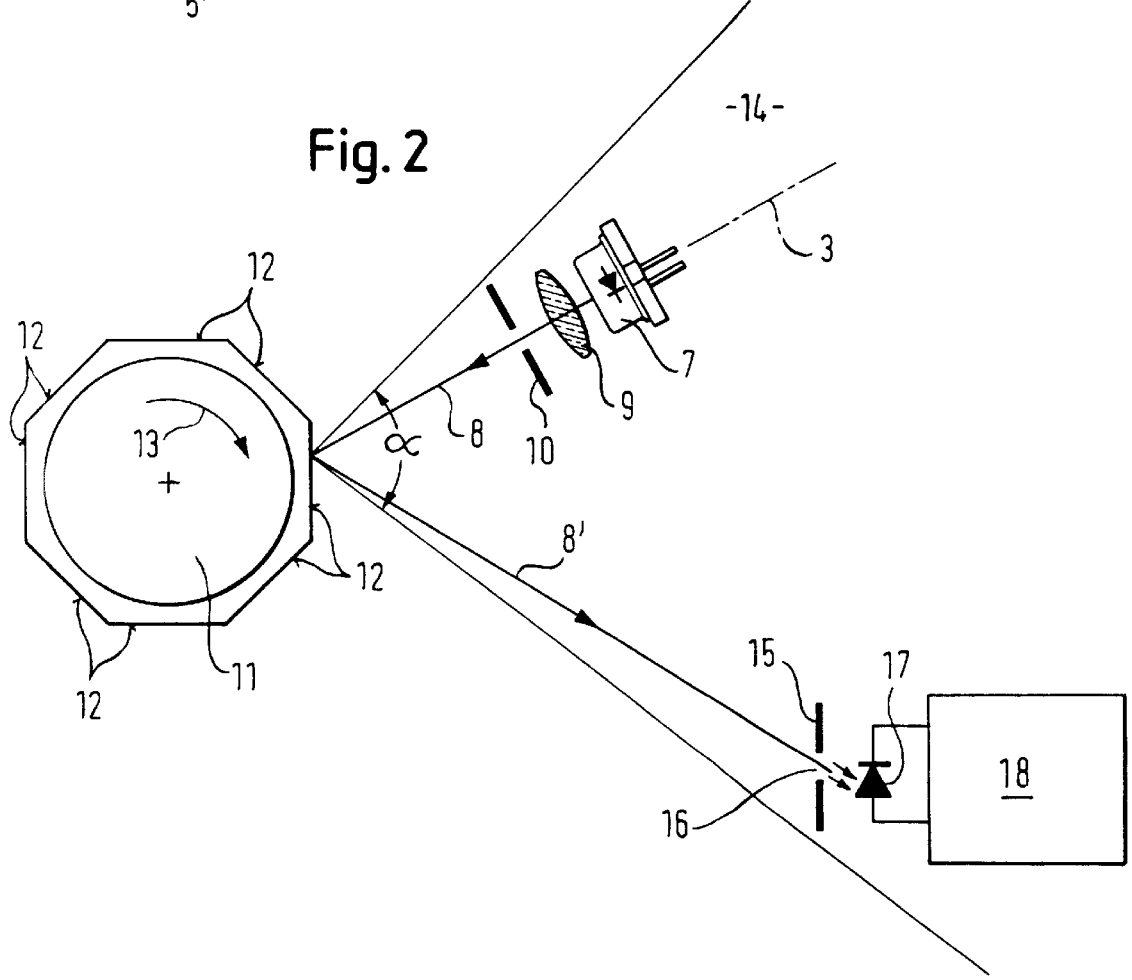

METHOD AND APPARATUS FOR DETERMINING THE POSITION OF THE FOCUS OF AN OPTO-ELECTRONIC APPARATUS

BACKGROUND OF THE INVENTION

The present invention relates to a method for determining the position of the focus of an opto-electronic apparatus, in particular of a bar code reader. Furthermore the invention is directed to an opto-electronic apparatus, in particular for carrying out a method of this kind.

In order to be able to use opto-electronic apparatuses of this kind, in particular bar code readers, as flexibly as possible, it is known to select the position of the focus, i.e. the distance between the point of convergence of the transmitted light beam and a fixed point determined with respect to the opto-electronic apparatus, for example the outlet opening for the light beam from the housing of the opto-electronic apparatus, from a series of positions of the focus predefined by the design of the apparatus. For this purpose the focusing lens can for example be displaced in the direction of its optical axis, or tilted, via a stepping motor, so that the distance between the lens and the element which transmits the light, for example a laser diode, is adjustable.

In the context of the manufacturing process of these opto-electronic apparatuses, stepping motor positions and lens positions are associated with one another in a calibration process, by means of which the desired values can be achieved for the different positions of the focus.

Depending on the application, very high demands exist with respect to the long-term stability of these values which are to be set for the positions of the focus, so that the tolerances for the individual components must be kept very small. By way of example, the required positional accuracy for the object distance (spacing laser diode to lens) can be less than ±0.5 µm in an individual case.

As a result of these extreme requirements on the long-term stability of the geometrical arrangement of the individual optical elements, it is only possible to use methods for the adjustment of the lens which ensure the required high precision over the total expected working life of the opto-electronic apparatus. This method and the mechanical devices which are required for it are very complicated and thus very costly to manufacture.

SUMMARY OF THE INVENTION

It is an object of the invention to provide an opto-electronic apparatus and also a method for the operation of this apparatus with which a precise and reliable adjustment of all positions of the focus is ensured even without the complicated and thus costly design measures which have been described.

The part of the object relating to the method is satisfied by a method of determining the position of the focus of an opto-electronic apparatus, in particular of a bar code reader, which transmits a light beam through a focusing lens, wherein the width of the transmitted light beam is found at a specific reference position, or a value representative for the width is found, and wherein the position of the focus is determined from the found width or value respectively.

The part of the object relating to the apparatus is satisfied by an opto-electronic apparatus, in particular by a bar code reader, comprising a transmitter which transmits a light beam, a lens which focuses the transmitted light beam, a light sensitive sensor which is adapted and arranged to receive the light beam transmitted from the transmitter and is also designed to produce a signal representative for the width of the light beam at a specific reference position, and also comprising an evaluation circuit connected to a sensor through which the position of the focus of the opto-electronic apparatus can be found from the signal produced by the sensor.

The invention is based on the fundamental consideration that for the adjustment of specific positions of the focus it should in each case be possible to detect the actual position of the focus when regulating this position of the focus. In this respect the position of the focus should be detectable for apparatuses having a constructional size of less than 100 mm edge length which are intended to enable reading distances of up to 2.5 m and in an extreme case of up to 5 m.

In accordance with the invention, for the determination of the respective actual position of the focus, the width of the transmitted light beam is determined at a predetermined reference position, or a value representative for this width is found. Even though reference is only made in the following to the width of the light beam, a value representative for the width can be determined in the method of the invention instead of the width and can form the basis for the method.

The actual position of the focus is subsequently determined from the respectively determined width. Through the recognition that an unambiguous relationship exists between the width of the light beam and the position of the focus it is possible to determine the width of the light beam at a specific reference point instead of the actual position of the focus. This is advantageous because the determination of the width of the light beam can be carried out more easily and accurately than the direct determination of the prevailing, actual position of the focus.

In accordance with a further advantageous embodiment of the invention, the transmitted light beam is deflected via a deflection device, in particular via a rotating mirror wheel. In this connection the transmitted light beam is pivoted by the deflection device, and is in particular periodically pivoted.

The transmitted light beam preferably sweeps over a light sensitive sensor and the width of the light beam is found from the duration of the sweep. Thus, the customary pivoting of the scanning beam in bar code readers can simultaneously be used to determine the width of the scanning beam and thus the actual position of the focus. The sensor which is used for this is advantageously not only used to determine the width of the scanning beam, but rather for example for the synchronization of the scanning or as a reference element for the distance measurement. Thus the additional costs which arise for the determination of the width of the scanning beam are so small that they can be ignored.

In accordance with a further advantageous embodiment of the invention the sensor generates a substantially pulse-like signal, with the pulse duration of the signal being determined and the width of the light beam being found from the pulse duration. The number of clock pulses which occur when the output signal of the sensor exceeds a specific threshold value can be counted in order to determine the pulse duration of the signal produced by the sensor when the scanning beam sweeps over it. The number of the clock signals counted thus provides a measure for the pulse duration for the signal produced by the sensor. In the knowledge of the speed with which the light beam sweeps over the sensor, the width of the light beam can be found from this speed and from the duration of the sweep across the sensor, which corresponds to the pulse duration found for the output signal of the sensor. If the light beam is, for example, deflected by a rotating mirror wheel, then the scanning speed at the location of the sensor can be calculated from the speed of rotation of the mirror wheel and from the distance between the mirror wheel and the sensor.

A diaphragm, in particular a slit diaphragm is preferably provided in the beam path in front of the sensor, with the light beam being guided over the diaphragm so that only the part of the light beam which passes through the diaphragm sweeps over the sensor arranged behind the diaphragm. In this way a situation is achieved in which the sensor is only swept over by a very narrow defined section of the cross-sectional area of the light beam, so that the pulse duration of the output signal produced by the sensor can be determined very accurately.

The sensor is preferably arranged in the marginal region of the angle of pivoting of the pivoted light beam, so that the region scanned by the light beam is only restricted by a minimum. It is however also possible to direct the light beam onto the sensor, or onto the diaphragm, via a beam divider, so that the part of the light beam which is not directed by the beam divider onto the sensor, or onto the diaphragm, sweeps over the scanning region over the total angle of pivoting without hindrance.

In accordance with a further advantageous embodiment of the invention the reference position at which the width of the transmitted light beam is determined is disposed within the opto-electronic apparatus, in particular close to the transmitter element which transmits the light beam. In this way a very compact manner of construction of the opto-electronic apparatus is achieved, with all the components, including the sensor required for the width determination, and also advantageously the evaluation circuit, being arranged within a common housing in particular.

In accordance with a further preferred embodiment of the invention the position of the focus is calculated from the width that is found for the light beam with reference to a predetermined equation. Through the calculation of the position of the focus from the width that is found an immediate, and thus a direct, determination of the respective position of the focus is possible. As the calculation is however relatively complicated and time-intensive the position of the focus is derived in accordance with a further preferred embodiment, from the width that has been found from a predetermined table, which has in particular been stored in a memory. The stored values can thereby be preferably produced by determining and in particular measuring, for a plurality of positions of the focus, the width of the light beam corresponding to each position of the focus in a learning process, and by storing the respectively found width together with, or in dependence on, the corresponding position of the focus.

Thus, in accordance with the invention, the calibration to a plurality of positions of the focus, and thus to a range of positions of the focus, takes place, with this calibration having the advantage, relative to the pure calculation of the position of the focus, that tolerances specific to the operation are directly detected by the calibration. After determining the width of the light beam the associated position of the focus can thus be directly obtained by reading out the corresponding value from the stored table. If the width value of the light beam that is found is not directly stored in the table, then the corresponding value of the position of the focus can be found by interpolation.

In accordance with a further advantageous embodiment of the invention the opto-electronic apparatus is adjusted, and in particular the lens is tilted and/or displaced along its optical axis, with respect to the position of the focus that has been found until a predetermined position of the focus is reached. In this respect the position of the focus that is found is preferably supplied to a regulating circuit which compares the position of the focus that has been found with the predetermined position of the focus and the opto-electronic apparatus is adjusted by the regulating circuit, and in particular the position of the lens is changed, until the position of the focus that is found is substantially the same as the predetermined position of the focus.

Through the regulation of the position of the focus in accordance with the invention the precise setting of a desired position of the focus can also be ensured when the values originally determined for the adjustment mechanism, during the manufacture of the apparatus, no longer precisely correspond to the desired position of the focus, for example as a result of wear or other long-term effects. Through the determination of the actual position of the focus in accordance with the invention, and through the regulation in accordance with the invention, the adjustment mechanism is controlled until the desired position of the focus corresponds to the actual position of the focus that has been found and is thus accurately set.

In accordance with a further advantageous embodiment of the invention the object distance to an object scanned by the light beam is found, the object distance that has been found is compared with the position of the focus that has been found and the opto-electronic apparatus is adjusted, and in particular the position of the lens is changed, until the object distance is substantially the same as the position of the focus that has been found. In this manner an automatic adjustment of the sharpness, and thus an autofocus system, can be realized with the method of the invention and with the apparatus formed in accordance with the invention.

In accordance with a further preferred embodiment of the invention the transmitted light lies in the visible range. Accordingly, both the transmitter element and also the sensor, as well as the remaining optical elements of the apparatus, are designed to produce or process visible light. The transmitted light can however basically also lie in the non-visible range, for example in the infrared range. In this case the transmitter element, the sensor and also the remaining optical elements are designed for the transmission or reception and processing of light of a corresponding wavelength.

BRIEF DESCRIPTION OF THE DRAWINGS

In the following the invention will be described in more detail with reference to an embodiment and to the following drawings:

FIGS. 1a and 1b show the shape of a light beam focused by a focusing lens with two different positions of the focus, FIG. 2 is a schematic illustration of important parts of the apparatus designed in accordance with the invention.

DESCRIPTION OF THE PREFERRED EMBODIMENTS

Figure 3:
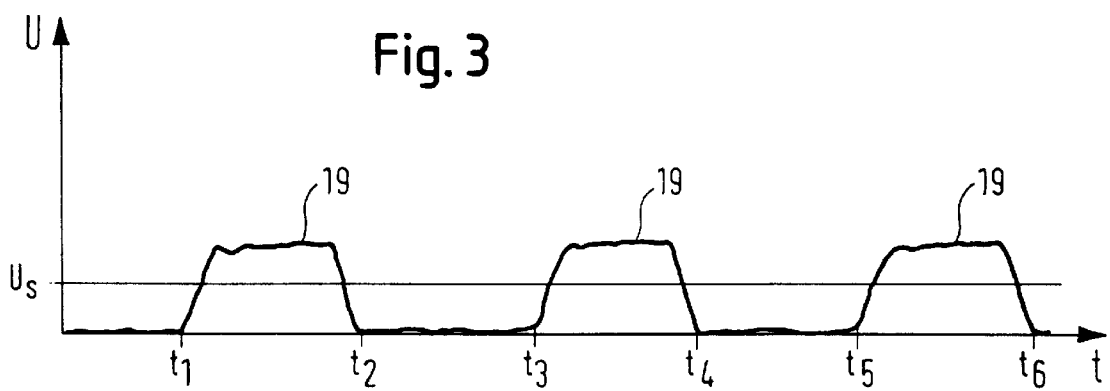
FIG. 3 shows a pulse sequence produced by the sensor of an apparatus designed in accordance with the invention.

FIGS. 1a and 1b show a lens 1 which focuses a light beam 2 representing a bundle of light of finite thickness into a point of convergence 4 lying on the optical axis 3 of the lens 1.

The distance between the point of convergence 4 and the lens 1 is termed the position of the focus 5 in the following. In principle the position of the focus 5 can be designated as the distance between the point of convergence 4 and any other arbitrary point which is of fixed location relative to the lens 1 or relative to the transmitter element which transmits the light beam.

The width 6 of the light beam is characterized by a black bar at a position x between the lens 1 and the point of convergence 4. For a light beam 2 of circular diameter this width corresponds to the diameter of the light beam 2 at this position x.

In FIG. 1b the arrangement of FIG. 1a is shown with a shortened position 5' of the focus. One recognizes that the width 6' of the light beam 2 at the position x is significantly smaller than the width 6 of FIG. 1a.

The invention exploits the recognition schematically illustrated in FIGS. 1a and 1b that the width of the light beam 2 at a predetermined position x corresponds to the respective position of the focus, so that a conclusion can be drawn on the respective actual position of the focus from the width of the light beam that is found.

In order to determine the width of the light beam, and thus the actual position of the focus, the apparatus shown schematically in FIG. 2 can, for example, be used.

In FIG. 2 an optical transmitter 7 formed as a laser diode transmits a light beam 8 through a lens 9 and through a diaphragm 10 disposed in the beam direction behind the lens 9, in the direction of a rotating mirror wheel 11. The position of the focus of the apparatus is adjustable in this arrangement by a non-illustrated adjusting device, through which, for example, the lens 9 can be shifted along its optical axis 3 or tilted.

The mirror wheel 11 is formed as a polygonal mirror wheel with eight planar mirror elements 12 provided at its outside and can be driven via a non-illustrated driving motor in the clockwise sense as is indicated by an arrow 13.

The light beam 8 which strikes the respective mirror element 12 is reflected by the mirror element 12, so that the reflecting light beam 8' periodically sweeps over a scanning range 14 extending over an angle a on rotation of the mirror wheel 11.

In the marginal region of the scanning range 14 indicated at the bottom of FIG. 2 there is arranged a diaphragm 15 with a diaphragm opening 16 and also a light sensitive sensor 17 formed as a photodiode and arranged behind the diaphragm 15, with the sensor 17 being connected to an evaluation circuit 18.

The light beam designed by 8' and reflected at one of the mirror elements 12 sweeps over the diaphragm 15 on the rotation of the mirror wheel 11 so that light strikes the sensor 17 as it sweeps over the opening of the diaphragm 16. An electrical signal is produced, as a result of the light beam 8' of finite width striking the sensor 17, which is supplied to the evaluation circuit 18 and is processed and evaluated by the latter in the manner which will be described in more detail in the following.

FIG. 3 shows the output signal of the sensor 17 which is produced when the reflected light beam 8' sweeps across the diaphragm opening 16 three times.

As long as the sensor 17 is not illuminated by light the output voltage U present at the output of the sensor 17 is essentially equal to zero. At the time point $t_1$ the outer margin of the reflected light beam 8' has reached the edge of the diaphragm opening 16 disposed towards the light beam, so that the part of the reflected light beam 8' which is not screened off by the diaphragm 16 strikes the sensor 17 and brings about an increase of the output voltage U. The output voltage U rises until the reflected light beam 8' passes through the diaphragm opening 16 over its full width and strikes the sensor 17.

The output voltage U produced by the sensor 17 remains substantially constant during a further movement of the reflected light beam 8' until the leading edge of the light beam 8' reaches the edge of the diaphragm opening 16 lying in the direction of sweeping. During a further movement of the light beam 8' an ever larger region of the light beam 8' is screened off by the diaphragm 15, so that the output voltage U of the sensor sinks again towards zero as shown in FIG. 3 until it is substantially equal to zero again at the time point $t_2$.

In this manner a voltage pulse 19 is produced at the output of the sensor 17 for each sweeping of the reflected light beam 8' over the diaphragm opening 16.

Figure 4:
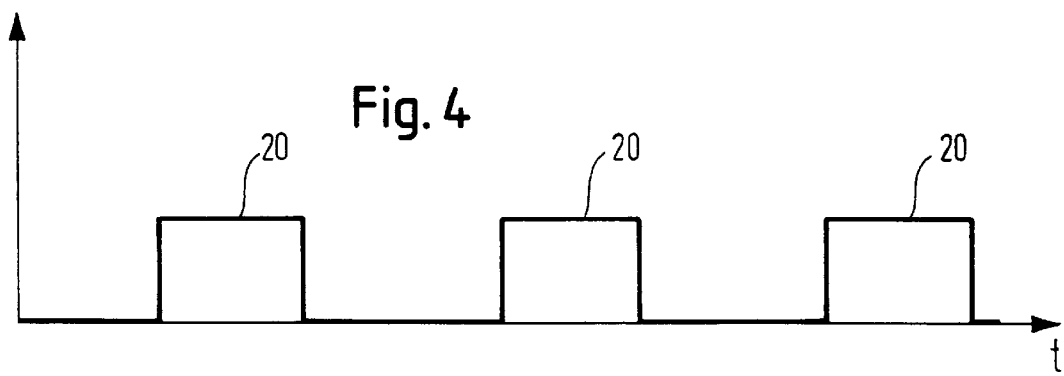
FIG. 4 shows the pulse sequence of FIG. 3 digitized in accordance with the invention.

In accordance with the invention these voltage pulses are supplied to a threshold value circuit provided in the evaluation circuit 18 which, on exceeding a threshold voltage value $U_s$, produces a binary signal with pulses 20 as shown in FIG. 4. The width of a pulse 20 is in each case a measure for the duration of the sweep across the diaphragm opening 16 of the reflected light beam 8'. As this time duration is in turn dependent on the width of the reflected light beam 8' this width can be calculated from the duration which is found for the pulses 20, and also from the speed of the light beam 8' at the location of the sensor 17. In this respect the calculation of the speed of the light beam 8' at the location of the sensor can in turn be calculated from the known speed of rotation of the mirror wheel 11, and from the distance between the mirror wheel 11 and the sensor 17.

The time durations of the pulses 20 determined with the aid of the evaluation circuit are related to the switching threshold $U_s$, which can for example correspond to 50% of the signal amplitude. Intensive fluctuations resulting, for example, from different remission of behaviors of the different mirror segments 12 can be taken into account by a peak detector circuit.

Figure 5:
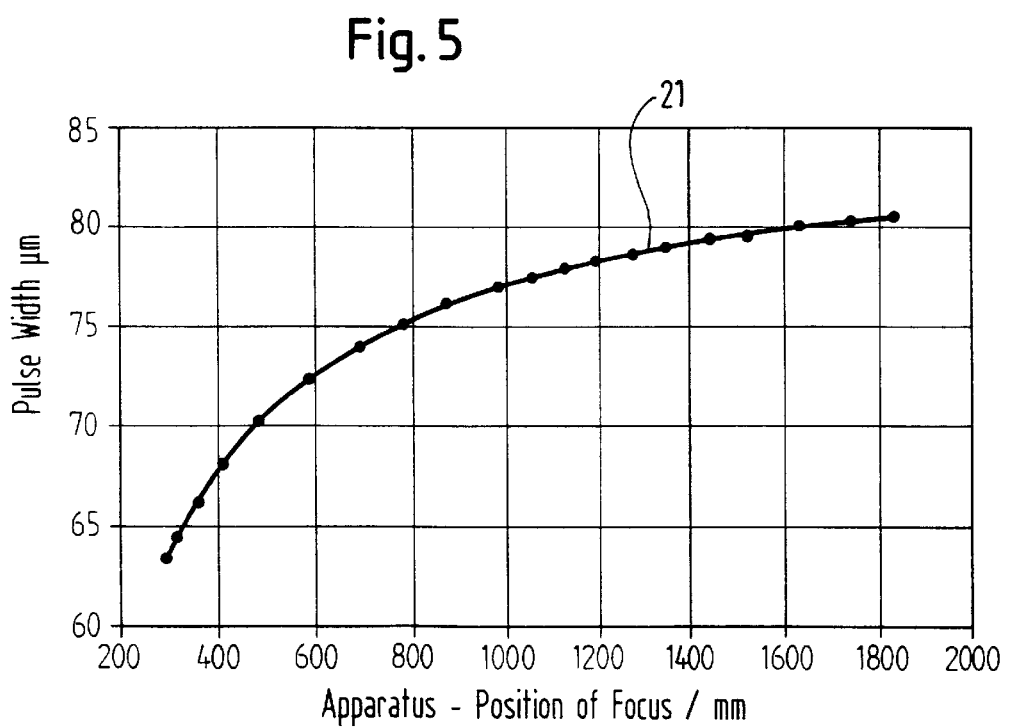
FIG. 5 is a diagram with measured pulse widths for different positions of the focus.

In FIG. 5 the width of the pulses 20 found for a plurality of different positions of a focus are graphically shown in a curve 21. It is evident, from the monotonically raising shape of the curve 21, which represents the functional association between the respective position of the focus and the corresponding width of the pulses 20, that a determination of the respective actual position of the focus is possible in a very simple manner via the determination of the width of the pulses 20.

Figure 6:
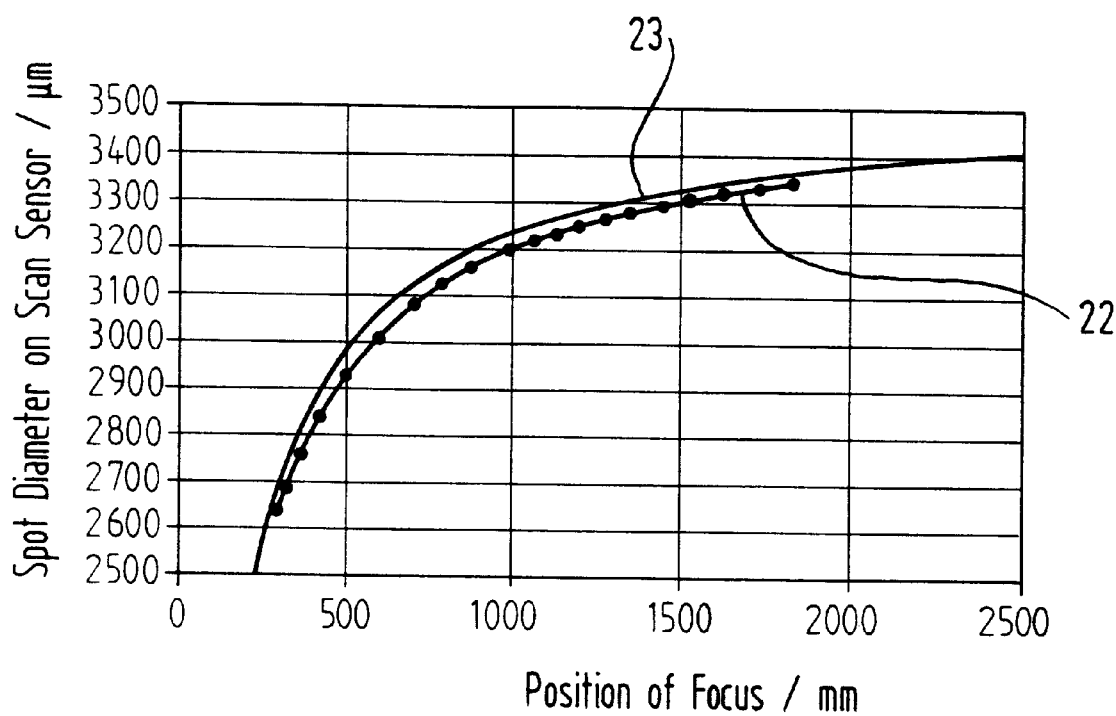
FIG. 6 is a diagram with a comparison of calculated light beam widths and light beam widths found by measurement related to different positions of the focus.

After conversion of the width of the pulses 20 via the speed of the light beam 8' at the location of the sensor 17 into the width of the light beam 8' at the location of the sensor 17, the dependency shown in FIG. 6 by a curve 22 results between the width of the light beam 8' and the respectively associated position of the focus.

The dependency found by calculation between the respective position of the focus and the width of the light beam 8' is likewise shown in FIG. 6 in a curve 23. The comparison of the curves 22 and 23 clearly shows a good agreement between the calculated dependence and the measured values. In the practical application the respectively associated width of the light beam 8' at the location of the sensor 17 is determined, for example in a learning or calibration process, for a plurality of predetermined positions of the focus. The dependencies which have been found in this manner are stored in a memory from where they can be called up for the operation of the apparatus.

If, in the operation of the apparatus, a specific position of the focus is to be set, then the corresponding width value of the light beam 8' can be read out from the memory, whereupon this read-out width value is compared with the actually found width value via the sensor 17 and the evaluation circuit 18. The position of the lens 9 is adjusted via the regulating circuit until the actual width value of the light beam 8' obtained via the evaluation circuit 18 corresponds to the desired width value read-out from the memory, so that the actual position of the focus is the same as the desired position of the focus associated with this width value. Thus, via the measurement of the width of the light beam 8', the position of the lens 9 can be changed via a regulating circuit until the measured width of the light beam is the same as the width of the light beam corresponding to the desired position of the focus.

The adjustment of the position of the lens 9 can take place via a mechanical adjustment device, for example by means of a stepping motor. Instead of a stepping motor, piezo actuators can also be used for example in the method of the invention or in the apparatus of the invention. The principal problem which applies to these elements, namely that hysteresis must be taken into account during the adjustment, on the one hand, and that the adjustment characteristics can change in dependence on the temperature and the age of the elements, on the other hand, can be solved without difficulty through the regulation of the invention. Accordingly, the advantages which can be achieved by the piezo actuators, such as a reduction of the constructional size, an increase of the speed of adjustment and cost advantages, can be exploited.

As a further variant for the adjustment device, moving coil arrangements can be used such as are for example used in CD players.

As the sensor which is used for the determination of the width of the light beam can be used additionally for the synchronization of the light beam and as a reference element for the distance measurement, the additional cost required for the apparatus of the invention is negligible, in particular on taking account of the cost advantages that are to be expected through the invention.

If the apparatus of the invention or the method of the invention is combined with an automatic distance measurement then the distance measurement can determine the distance to an object arranged in the scanning region and this distance that has been found can be supplied to the regulation circuit of the invention as the desired value for the position of the focus. Through the described regulation in accordance with the invention the lens 9 is so automatically regulated that the width of the light beam 8' found by the sensor 17 is the same as the stored width of the light beam 8' corresponding to the desired position of the focus. In this manner the point of convergence is placed onto the object disposed in the scanning region, so that an autofocus system is realizable through the invention. A very rapid regulation of the position of the focus to a predetermined object distance is possible using the invention, so that the customary restrictions with respect to the depth of the focus of the scanning unit, for example of a bar code reader, and thus with respect to the scanning performance, are avoided.

What is claimed is:

1. Method of determining a position of focus of a bar code reader which transmits a light beam through a focusing lens comprising measuring a width of the transmitted light beam, or a value representative for the width, at a specific reference position, and determining the position of focus from the measured width or value, respectively, by sweeping the transmitted light beam over a light sensitive sensor and determining the width of the light beam or the representative value from a duration of the sweep over the sensor.

2. Method in accordance with claim 1 wherein the transmitted light beam is deflected via a deflecting device.

3. Method in accordance with claim 2 wherein the deflecting device includes a rotating mirror wheel, and including deflecting the transmitted light beam with the mirror wheel.

4. Method in accordance with claim 2 including pivoting the transmitted light beam with the deflecting device.

5. Method in accordance with claim 1 wherein the sensor generates a pulsed signal which determines a pulse duration of the signal and wherein the width of the light beam is determined from the pulse duration.

6. Method in accordance with claim 1 including placing a slot diaphragm in a path of the beam in front of the sensor, and guiding the light beam over the diaphragm so that only the part of the light beam which passes through the diaphragm sweeps over the sensor arranged behind the diaphragm.

7. Method in accordance with claim 1 wherein the light beam is directed via a beam divider onto the sensor, or onto an aperture diaphragm provided in front of the sensor.

8. Method in accordance with claim 1 wherein the step of measuring the width of the light beam is performed at the reference position which is disposed within the bar code reader.

9. Method in accordance with claim 1 including calculating the focal position from the measured width by way of a predetermined equation.

10. Method in accordance with claim 1 including deriving the position of the focus in dependence on the measured width from a preset table stored in a memory.

11. Method in accordance with claim 1 including determining in a learning process for a plurality of positions of the focus the widths of the light beam corresponding to each position of the focus, and storing the widths with or in dependence on the corresponding positions of the focus.

12. Method in accordance with claim 1 including adjusting the bar code reader with respect to the position of the focus which has been determined by at least one of tilting the lens and shifting the lens along its optical axis until a predetermined position of the focus is achieved.

13. Method in accordance with claim 12 including supplying the position of the focus that has been determined to a regulating circuit, comparing the position of the focus which has been determined with the predetermined position of the focus, and adjusting the bar code reader by changing with the output of the regulating circuit the position of the lens until the position of the focus which has been determined is substantially the same as the predetermined position of the focus.

14. Method in accordance with claim 12 including determining a distance to an object scanned by the light beam, comparing the object distance with the position of the focus which has been determined, and adjusting the position of the lens until the object distance is substantially the same as the position of the focus which has been determined.

15. Method in accordance with claim 1 wherein the transmitted light lies in the visible range.

16. Bar code reader comprising a transmitter which transmits a light beam, a lens which focuses the transmitted light beam, a light sensitive sensor which is adapted and arranged to receive the light beam transmitted from the transmitter and which produces a signal representative of a width of the light beam at a specific reference position, and an evaluation circuit connected to the sensor which determines the width of the light beam from a duration of the sweep of the light beam over the sensor and therefrom determines a position of focus of the bar code reader.

17. Apparatus in accordance with claim 16 including a slot diaphragm through which the light beam passes and falls onto the sensor arranged in the beam path between the lens and the sensor.

18. Apparatus in accordance with claim 16 including a rotating mirror wheel for periodically pivoting the transmitted light beam through a specific pivoting angle.

19. Apparatus in accordance with claim 18 wherein the sensor is arranged in a marginal region of the pivoting angle.

20. Apparatus in accordance with claim 16 including a beam divider arranged in the beam path between the lens and the sensor.

21. Apparatus in accordance with claim 20 wherein the beam divider is arranged between the deflection device and the sensor.

22. Apparatus in accordance with claim 21 wherein the beam divider is arranged between the deflection device and the diaphragm.

23. Apparatus in accordance with claim 16 including a storage element in which there is stored, for a plurality of different positions of the focus, the width of the light beam corresponding to each respective position of the focus, together with or in dependence on the corresponding position of the focus.

24. Apparatus in accordance with claim 16 including an adjustment device for adjusting the position of the focus of the bar code reader by at least one of tilting and shifting the lens along an optical axis of the lens.

25. Apparatus in accordance with claim 24 including a regulating circuit connected to the evaluation circuit, the regulating circuit receiving the position of the focus which has been determined as a regulating parameter, the position of the focus being capable of comparison with a predetermined position of the focus forming a guide parameter for the regulating circuit and the regulating circuit being connected to the adjustment device to which the output signal of the regulating circuit can be supplied as a manipulated variable.

26. Apparatus in accordance with claim 16 wherein the bar code reader transmits visible light.

27. Apparatus in accordance with claim 16 wherein the sensor is formed to receive visible light.

28. Apparatus in accordance with claim 16 wherein the transmitter, the lens and the sensor are arranged within a common housing of the bar code reader.

29. Method of determining a position of focus of a bar code reader which transmits a light beam through a focusing lens comprising locating a light sensitive sensor at a specific reference position, sweeping the transmitted light beam over a light sensitive sensor, determining the width of the light beam or a value representative of the width of the light beam from a duration of the sweep over the sensor, and determining the position of focus of the light beam from the width or the representative value of the width of the light beam.

* * * * *